Figure 1:
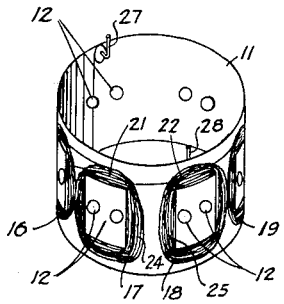

Feb. 13, 1962  E. L. SWAINSON  3,020,627
COIL-FABRICATING METHOD

Filed July 6, 1956 3 Sheets-Sheet 1

INVENTOR
Edward L. Swainson
BY
ATTORNEYS

Feb. 13, 1962 E. L. SWAINSON 3,020,627
COIL-FABRICATING METHOD
Filed July 6, 1956 3 Sheets-Sheet 2

INVENTOR
Edward L. Swainson
BY
ATTORNEYS

Feb. 13, 1962  E. L. SWAINSON  3,020,627
COIL-FABRICATING METHOD
Filed July 6, 1956  3 Sheets-Sheet 3

INVENTOR.
EDWARD L. SWAINSON
BY
ATTORNEYS

3,020,627
COIL-FABRICATING METHOD
Edward L. Swainson, Newtonville, Mass., assignor, by mesne assignments, to Northrop Corporation, Beverly Hills, Calif., a corporation of California
Filed July 6, 1956, Ser. No. 596,336
3 Claims. (Cl. 29—155.57)

My invention relates to a method for fabricating coils for electrical apparatus.

Specifically, my invention relates to a method for fabricating coils for the rotors of electrical devices which incorporate both rotors and stators.

Still more specifically, my invention relates to a method for fabricating coils upon the rotatable sleeve of a torque generator or similar device wherein the rotatable sleeve and its associated coils must be very thin in order to minimize flux-fringing effects at the gap within which the sleeve is rotatable.

In many electrical systems and pieces of electrical apparatus, it would be desirable to have and employ a device capable of producing within a small volume a comparatively large torque. The requirements imposed upon such a device are especially severe when it is desired to produce a substantial torque which is a precisely known function of a comparatively small input current or power. Such requirements might be imposed, for instance, in a fire-control system where the precession of a gyroscope must be linearly related to an electrical quantity such as the current flowing in the coils of the device which produces the torque that resists the precession of the gyroscope. In order to produce such a torque, the familiar D'Arsonval type of movement might be employed. For an application similar to the gyroscope, however, the overall form factor dictates the use of a torque generator that is short in axial length compared to its diameter. If the conventional 2 pole D'Arsonval movement is built in this form, it will be found that the end turns of the moving coil become a larger proportion of the total coil length, which is wasteful of electrical power, since torque is produced only by the length or component of length of the coil conductors parallel to the axis of rotation of the coil structure. The end turns serve only to conduct the current from one side of the structure to the other, and in doing so, use up power in the form of $I^2R$ losses. Therefore, a torque generator with a smaller proportion of end turn length to active torque producing turn length, yet having an axial length short compared to its diameter, will be more suitable for such applications.

Such a torque generator might comprise, for instance, a high-grade permanent magnet having six poles arranged about a central hub like the spokes of a wheel, a flux-return path such as an iron ring surrounding the permanent magnet but slightly spaced therefrom, and a non-magnetic sleeve interposed in the narrow gap between the iron ring and the pole faces of the permanent magnet. Such a non-magnetic sleeve would have fastened to the surface thereof the coils for carrying the current which, together with the magnetic flux produced by the permanent magnet, would produce the desired torque. Still further, such a non-magnetic sleeve would be mounted to accommodate at least a slight degree of rotation and would be so arranged as to transmit the generated torque to some appropriate utilization device such as the previously mentioned gyroscope.

The non-magnetic sleeve, to which reference has been made supra, may be mounted in the air gap between the pole faces of the permanent magnet and the magnetic ring which serves as a flux-return path. It will be understood that such a configuration might be varied somewhat as, for instance, by employing a star-shaped centrally located permanent magnet and a second permanent magnet having a toroidal yoke and inwardly extending salient poles respectively arranged vis-a-vis the poles of the star-shaped centrally located magnet. In such a case, each magnet would serve as the flux-return path for the other magnet and, in addition, would serve to augment the flux density available in the air gap between the magnets. Whichever magnetic structure is employed, however, it will not be possible to take full advantage of the available magnetomotive force unless the air gap is kept to a minimum. Such minimization of the air gap means that the coil-carrying sleeve which is rotatably mounted in the air gap must be very thin and, further, that the coils themselves must be very thin. Moreover, the coils should be attached to the sleeve in such a way that the portions of the coils which are active in producing torque are maximized, while the portions of the coils which serve only to connect the active portions are minimized. These latter portions dissipate power but themselves produce no torque, thus reducing the efficiency of torque generation. However, if an attempt is made to achieve windings which are characterized by both minimum non-torque-producing portions and minimum air-gap thickness, there may be difficulties in securing the coils to the sleeve or other member which supports the coils and transmits the torque generated therein. So far as I am aware, there has been no method, prior to my invention, for fabricating rotatable coil members which are sufficiently efficient in the generation of torque to satisfy the exacting requirements such as those imposed by the gyroscopes employed in certain types of apparatus.

Accordingly, it is an object of the invention to provide a method for fabricating the rotatable member of a torque generator or of a similar piece of electrical apparatus.

It is another object of the invention to provide a method for forming windings upon a thin sleeve in such a way that the sleeve and windings together will form an assembly which is thin enough to fit into a very narrow air gap.

It is a further object of the invention to provide a method for forming torque-generator windings large portions of which are active in producing torque.

It is a still further object of the invention to provide a method for forming windings on a sleeve in such a way that the sleeve will be capable of generating a comparatively large torque in a small volume.

It is still another object of the invention to provide a method for forming a rotatable element capable of being inserted into a magnetic air gap without causing substantial fringing effects of the magnetic flux.

It is a still further object of the invention to provide a method for fabricating a rotor capable of generating a torque which is a substantially linear function of the electric current flowing in the coils of said rotor.

Briefly, I have been able to fulfill these and other objects of the invention by means of a method wherein a number of coils, each occupying less than 180 degrees of arc, are wound upon the surface of a cylindrical sleeve by means of shallow bobbins temporarily fastened to said surface of the sleeve. The turns of wire of which the coils are formed may be bonded to one another and to the surface of the sleeve by baking and cooling the assembly of sleeve and coils to soften and set the thermosetting material with which the wire is covered, or by softening the wire insulation prior to winding the coils and letting the insulation harden after the winding step. Whichever means is employed for holding the coils in place on the sleeve, the coils should be firmly set before the bobbins are removed from the assembly. Then the coils may be connected in any desired fashion, and the completed rotor may be installed in the air gap of a torque generator.

Figure 2:
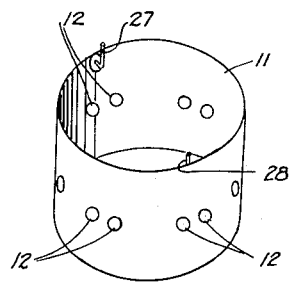
Figure 3:
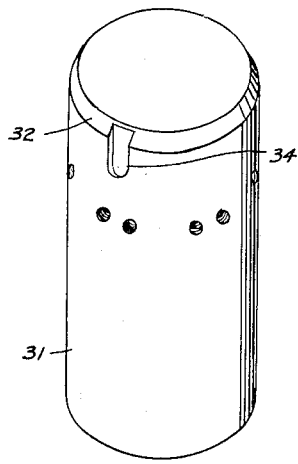
Figure 4:
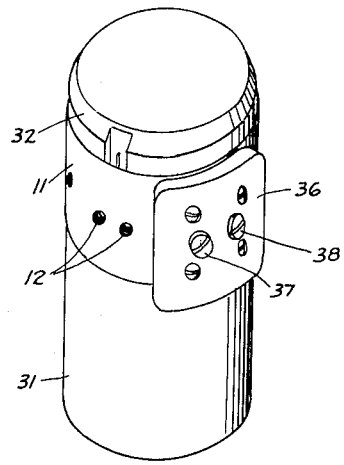
Figure 5:
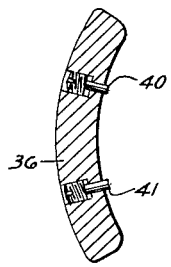
Figure 6:
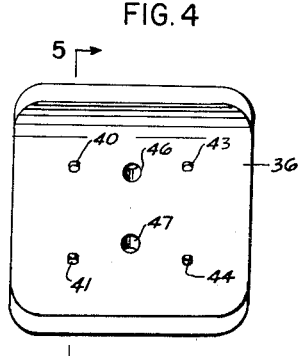

Other objects and features of the method according to my invention will become apparent upon consideration of the following detailed specification taken in conjunction with the associated drawings, in which:

FIG. 1 is a perspective view of a finished torque-generator rotor fabricated by the method according to my invention, FIG. 2 is a perspective view of a cylindrical sleeve upon which coils may be wound according to the method of my invention, FIG. 3 is a perspective view of a winding fixture upon which the sleeve of FIG. 2 may be temporarily mounted during the winding process, FIG. 4 is a perspective view of a winding fixture upon which are mounted a sleeve and one winding bobbin, FIG. 5 is a sectional top view of a winding bobbin such as may be employed in the method of my invention, FIG. 6 is a side view of a winding bobbin such as may be employed in the method of my invention.

Figure 7:
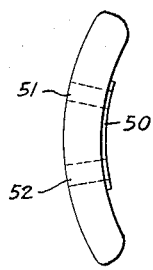
Figure 8:
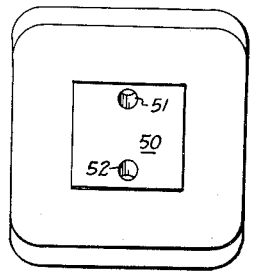
Figure 9:
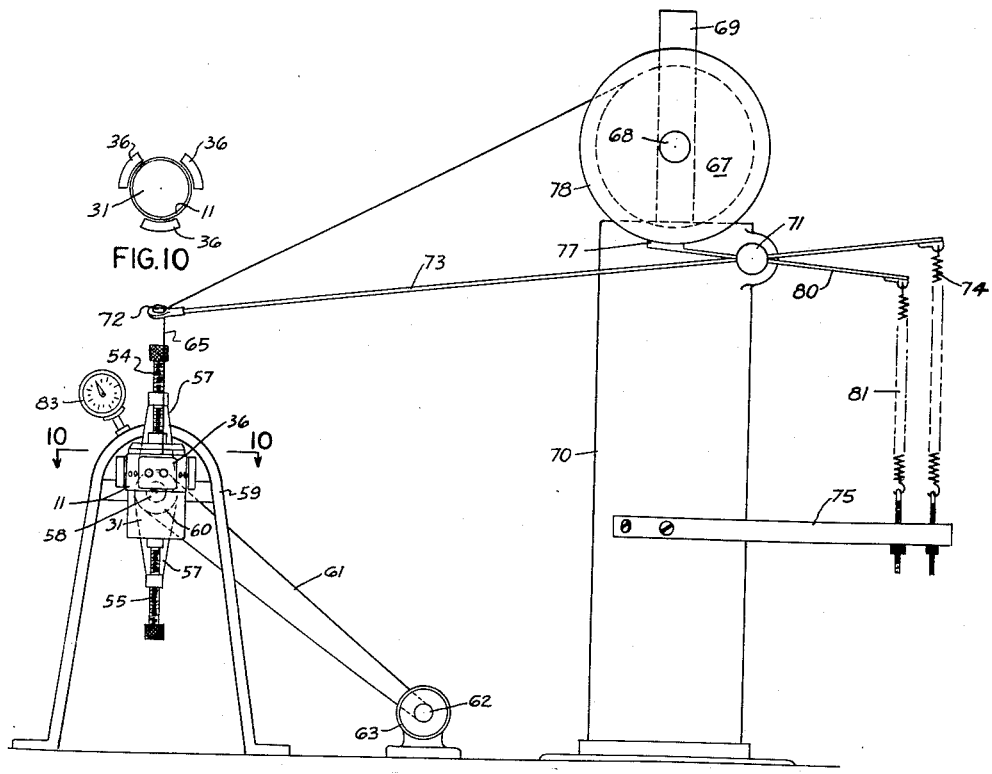
Figure 11:
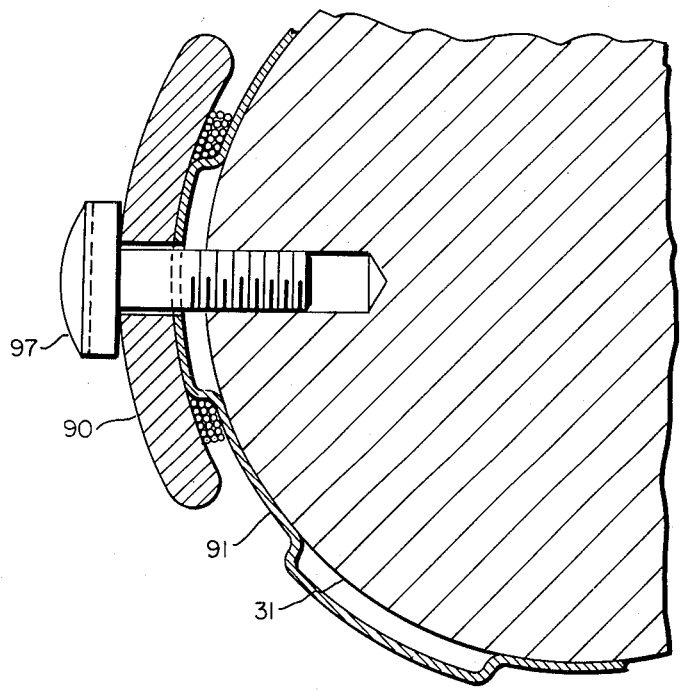
Figure 12:
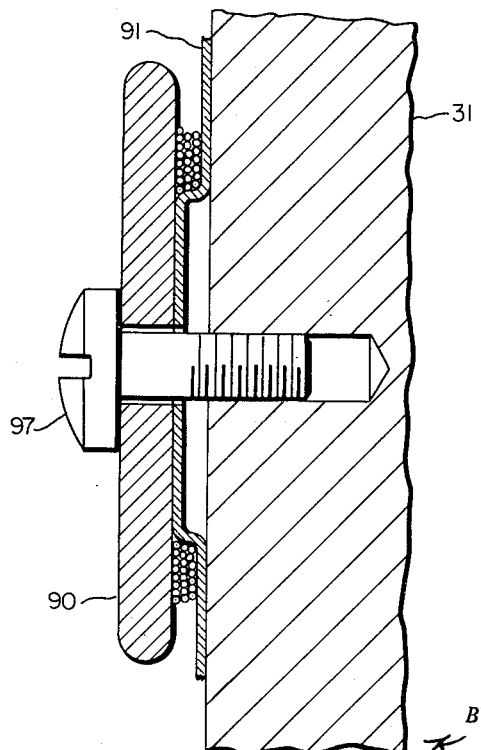

FIG. 7 is a top view of a second type of winding bobbin which may be employed in the method, FIG. 8 is a side view of this second type of winding bobbin, FIG. 9 is a side view of a winding apparatus by which the actual winding of the coils may be performed. A winding fixture carrying a sleeve and bobbins are shown in position for winding of a coil on the apparatus, FIG. 10 is a top view of a winding fixture carrying a sleeve and three winding bobbins as depicted in side view in FIG. 9, FIG. 11 is a top sectional view of a third type of bobbin and an alternative form of sleeve, and FIG. 12 is a side sectional view of this third type and alternative sleeve.

A detailed discussion of the method according to my invention may perhaps best be commenced by reference to FIG. 1, which shows a finished rotor as fabricated by my method. The finished rotor is ready to be inserted between the fixed permanent-magnet poles and the flux-return path of a torque generator or other similar device. It will be seen that the rotor comprises a cylindrical sleeve 11 having a number of pairs of holes bored therein and a number of coils 16, 17, 18 and 19 attached thereto. Coils 17 and 18 are shown in full, while only portions of coils 16 and 19 appear in the figure. It will be understood that the rotor should be symmetrical and that, in order to satisfy such a criterion, there should be two more coils on the surface of sleeve 11, not shown. For the purposes of this discussion, it will be assumed that the rotor is fitted with six substantantially rectangular coils, symmetrically arranged on the sleeve surface, and that the magnetic flux in which the rotor is to be installed will penetrate the sleeve substantially normal to its surface at six symmetrically disposed positions. Inasmuch as it will be assumed that alternate poles of the permanent magnet employed with this rotor are north poles while the remaining poles are south poles, it will be necessary for each such pole to be centered, in the finished device, under the mid-point between two adjacent coils. The coils must be wound in such a way that adjacent coil sides of adjacent coils on the sleeve carry currents which flow in the same direction. An alternative construction would consist of some smaller number of coils, as for example, three in the case of a six pole magnet. Each of the coils might then contain twice the number of turns as the six coil construction, and thus produce the same torque for the same current with a given magnet. The smaller number of coils, however, is not as desirable a method of construction, since the added turns will increase the axial length of sleeve 11 due to the added width of the inactive coil side 21 and also the opposite inactive coil side (not numbered on drawing) on all of the coils. Moreover, the degree of rotation allowed the rotor member should be small enough so that, even after displacement of the rotor, each pole of the magnet will still be substantially under a pair of adjacent coil sides of a pair of adjacent coils on the sleeve. By such a limitation, it may be assured that the fringing of the magnetic flux in and around the air gap will be minimized and the relationship between torque and coil current will be maintained at optimum consistency. Further, it will be noted that the coil sides 21 and 22, and those parallel thereto, are not long compared to coil sides 24 and 25 and other coil sides parallel to the axis of sleeve 11. This fact is important because only coil sides 24 and 25 and coil sides parallel thereto are effective in generating torque about the axis of sleeve 11, while coil sides 21 and 22, and other coil sides which are perpendicular to the axis of sleeve 11, do not contribute to the torque about the axis of the sleeve. Such coil sides serve only to connect the ends of the active coil sides, and waste power equal to the rate of heat generation by the current flowing therein. It will be apparent that the amount of power so wasted by coil sides 21 and 22 and similarly disposed coil sides is much less than the power which would be wasted by the corresponding coil positions of a D'Arsonval movement, which would have lengths corresponding substantially to the diameter of sleeve 11.

As for the components with the aid of which the finished rotor as shown in FIG. 1 is fabricated, FIG. 2 shows cylindrical sleeve 11, which is the basis for fabrication of the rotor. It will be noted that sleeve 11 is simply a cylindrical shell, which may be formed of aluminum, or any other strong, and preferably non-magnetic, material. Sleeve 11 has drilled or punched therein a number of pairs of holes, the number of such pairs of holes being equal to the number of coils which are to be formed upon sleeve 11. Preferably the axes of all the holes lie in a single plane normal to the axis of sleeve 11. Each pair of holes should be evenly spaced around the periphery of sleeve 11. The sleeve should be provided with a pair of terminals 27 and 28, one of which is fastened to, but insulated from, sleeve 11, while the other may be fastened to the sleeve in electrical contact therewith. Such terminals are, of course, optional and might both be fastened to the sleeve in insulated relationship therewith. I prefer to insulate only one terminal from the sleeve in order that the sleeve may assume the electrical potential of one end of the coil to be connected between the terminals. The terminals themselves may comprise short pieces of wire either cemented or riveted to the edge of the sleeve, depending upon whether insulation from the sleeve is or is not desired. Preferably the terminals should be attached to the sleeve at points 180 degrees apart on the edge of the sleeve.

In FIG. 3 is depicted a cylindrical winding fixture 31 upon which sleeve 11 may be mounted for the winding process. The diameter of fixture 31 should be just slightly smaller than the inside diameter of sleeve 11 so that the sleeve may just be slipped onto the fixture. If the fixture is held in the position shown in FIG. 3 with its bevelled edge uppermost, the sleeve should be slipped over the fixture with the sleeve terminals uppermost. The bevelled edge 32 of fixture 31 facilitates sliding sleeve 11 over fixture 31, and a pair of depressions cut into the surface of fixture 31 near bevelled edge 32 receive terminals 27 and 28, respectively, of sleeve 11. One of the pair of depressions is shown at 34, and the other depression is located in a corresponding position 180 degrees from depression 34. Fixture 31 is provided with a number of pairs of tapped holes in its cylindrical surface, the number being equal to the number of pairs of holes in sleeve 11. The holes in fixture 31 should be spaced exactly like the holes in sleeve 11, so that a screw passing through each of the holes in sleeve 11 may be received by one of the tapped holes in fixture 31. I prefer to form fixture 31 from aluminum and to coat it with a thin film of plastic insulating material to make it easy to slip sleeve 11 over the fixture and prevent the sleeve from sticking to the fixture.

In order to wind the coils upon the surface of sleeve 11, the sleeve should first be placed upon fixture 31 so that its holes coincide with those in the fixture, and then at least one winding bobbin should be fastened to the sleeve and winding fixture as shown in FIG. 4. For each winding bobbin, such as shown at 36 in FIG. 4, two screws 37 and 38 fasten the bobbin through holes in sleeve 11 to the corresponding tapped holes in fixture 31. One type of winding bobbin which I favor is shown in FIGURES 5 and 6. As will be observed from the sectional view of FIG. 5 and the side view of FIG. 6, the winding bobbin consists basically of a piece of material such as aluminum having a cross section which is bounded substantially by two radii and two concentric arcs, all having the same center point. The corners should be rounded somewhat in order to prevent the fine coil wire from becoming caught on the corners of the bobbin and perhaps being broken. This main portion of the bobbin may be termed the flange thereof and may be formed, for instance, by boring out the center of a piece of cylindrical bar stock and then cutting the resulting cylindrical shell into rectangular portions like that which is shown in FIG. 6.

FIGURE 5, which is a sectional view taken along the line 5—5 of FIG. 6, shows that bobbin 36 consists not only of the flange portion, which has already been described, but also of some means for making the flange portion stand out from the surface of sleeve 11 as a base for winding when the bobbin and sleeve are in position for winding coils, on winding fixture 31. In the sectional view of FIG. 5 are shown a pair of pins 40 and 41 which penetrate the flange and which extend out a short distance from the inner surface of the bobbin flange, the distance being equal to the desired thickness of the coils to be wound. Pins 40 and 41 may have threaded portions which fit into tapped holes in the bobbin flange, thereby providing for the amount of extension of the pins from the flange surface to be adjusted. When approximately the correct amount of pin length external to the bobbin flange has been achieved, cement applied to the pin threads may be allowed to set, thereby preventing the pins from thereafter moving. In order that the bobbin flange may be held stable during the winding of the coils, and in order that the coils may be generally rectangular, two more pins 43 and 44 are set in the flange to form, together with pins 40 and 41, a rectangle as shown in FIG. 6. The pins should, of course, be set at the corners of a rectangle equal in size to the desired inner dimensions of the coils which are to be wound thereon. In FIG. 6, two holes 46 and 47 are shown in the bobbin flange, through which holes screws 37 and 38 may pass to hold the bobbin and sleeve 11 on winding fixture 31. The corners of the bobbin flange as seen in FIG. 6 should be rounded off, in order to facilitate winding of the coil wire, in the same way that the edges of the flange as seen in the sectional view of FIG. 5 are to be rounded off.

An alternative form of winding bobbin is that which is shown in FIGURES 7 and 8, in which the "shank" of the bobbin consists simply of a raised portion 50 of the inner surface of the bobbin, rather than four pins set in the flange. Again, two holes 51 and 52 are provided for fastening the bobbin to winding fixture 31, and FIG. 7 is a view which shows that holes 51 and 52 are bored through the raised portion of the bobbin flange. Such a bobbin may be formed from a piece of stock by boring and milling the surface thereof to leave a raised land 50 to act as the shank of the bobbin, around which the coil is actually to be formed.

Assuming that one terminal has been fastened in insulated relationship to sleeve 11 and that another terminal has been fastened either in insulated relationship or conductively to sleeve 11, the sleeve may next be sprayed with an insulating lacquer or plastic material after masking the terminals. Such a coating of lacquer or plastic material minimizes the possibility of short circuits of the coils to the sleeve. After the spraying process, the sleeve may be baked to harden the insulating coating.

The actual coil-winding process may be performed on a device such as is shown in FIG. 9. I prefer to fasten sleeve 11 and three bobbins 36 to winding fixture 31 to form an assembly, as shown in plan view in FIG. 10, and then to place the assembly in a machine such as that shown in FIG. 9. The assembly is shown supported in the machine by a pair of thumb screws 54 and 55 which bear against the respective flat end surfaces of winding fixture 31. Thumb screws 54 and 55 are inwardly directed from the respective arms of a bracket 57 which may have roughly the configuration of the letter C, the bracket and thumb screws together thus forming a clamp. Bracket 57 is supported rotatably upon a shaft 58 set in bearings upon a stand 59. Shaft 58 may have fastened thereto a pulley 60 which is driven by means of a belt 61, a second pulley 62, and a motor 63.

As shown in FIG. 10, the three bobbins should be evenly spaced on the surface of the sleeve and winding fixture. The assembly of winding fixture, sleeve, and three bobbins should be set in the winding machine in such a way that one of the bobbins extends outward from the assembly in the opposite direction of the winding-machine shaft and in substantial alignment therewith. After having fastened one end of a piece of suitable wire 65 to one of the sleeve terminals, the actual winding may be begun upon the bobbin which is aligned with shaft 58 by rotation of the shaft while the wire is payed out from a suitably supported spool 67. We prefer to support spool 67 on a shaft 68 fixed to a stand 69 on a base 70, and we further prefer to pay out wire 65 through an eyelet 72 on an arm 73 which may be pivoted to base 70 by means of a shaft 71. A spring 74 secured at one end to arm 73 and at the other end to a fixture 75 helps to maintain the desired tension in wire 65. Correct tensioning of the wire may also be facilitated by means of a brake 77 which bears against a flange 78 of spool 67 and which is carried by an arm 80 pivoted on shaft 71. The active portion of brake 77 may be made of leather, felt, or any similar substance. A spring 81 secured at one end to arm 80 and at the other end to fixture 75 maintains brake 77 in contact with flange 78 with the desired degree of force. The tension maintained in wire 65 should, of course, be sufficient to cause firm winding of the coil but not sufficient to break the wire. During the winding process, the accumulation of windings may be measured by a counter 83 which is geared to shaft 58. Moreover, if desired, a tachometer, also geared to shaft 58, may be employed in order to be certain that the winding speed is not allowed to exceed that which can safely be maintained without breaking the wire.

We prefer to wind the desired number of turns on the first of the three bobbins and then, without breaking the wire, to rotate the fixture assembly 120 degrees in its clamp and wind the second of the three bobbins, in each case driving the winding machine at the maximum safe speed by means of motor 63. The wire pays out from spool 67 and builds up on the shank of the bobbin being wound, until the desired number of turns are in place. When the desired number of turns have been accumulated on each of the first two bobbins, the fixture assembly may again be rotated through an angle of 120 degrees to bring the third winding bobbin into alignment with shaft 58, at which time a third coil may be wound in a manner analogous to that in which the first two coils were wound. Thus three evenly spaced series-connected windings will have been completed, and the wire being payed out from spool 67 may at that time be cut, leaving a few inches of wire free for later connection to the fourth, fifth, and sixth coils. Once again, it may be re-emphasized that the winding direction of each coil should be such that the flow of current in adjacent coil sides of adjacent coils on the sleeve will be in the same direction.

When three equally spaced coils have been wound and the surplus wire has been cut, we prefer to place the winding-fixture assembly in an oven and bake it at a temperature of approximately 260 degrees F. for about two hours, thus fusing the thermoplastic material with which the windings are insulated. After the assembly is baked, it should be allowed to cool slowly to room temperature, thereby hardening the plastic material and bonding the turns of the coils securely to one another and to the sleeve which supports them. Following the curing of the first three coils, the winding bobbins should be removed from the sleeve. Inasmuch as the coils have been bonded to the sleeve, the coils will maintain their respective positions when the bobbins are withdrawn. The bobbins and sleeve may thereupon be re-mounted on the winding fixture in such a way that the bobbins occupy the vacant positions on the sleeve intermediate the first three coils. The assembly of fixture, sleeve, and bobbins may then be remounted in the winding machine in such a way that one of the bobbins is aligned with shaft 58, and the second set of three coils may be wound in a manner analogous to that in which the first three coils were wound. Assuming that the end of the wire, before the winding of the first three coils, was fastened to the insulated terminal of the sleeve, the end of the wire before the winding of the second set of three coils should be fastened to the remaining terminal of the sleeve. After the winding of the second set of three coils, the windings should be baked and cooled. Next the bobbins should be removed from the assembly, and the free ends of wire from the respective sets of three coils should be joined together by solder or any other suitable means. The joint between the two free ends of wire may be cemented to the sleeve in order to protect it from damage. In order further to protect the assembly of sleeve and six coils, a final layer of lacquer or plastic material may be sprayed onto the finished assembly, care being taken to mask the terminals before this final protective layer is applied. If desired, the finished rotor may then be oven cured again in order firmly to set all plastic material.

A third type of winding bobbin and a modified sleeve are shown in FIGS. 11 and 12. A series of raised sections are formed on sleeve 91, and a bobbin 90 is attached to each raised section by means of a screw 97. Screw 97 passes through the bobbin and the raised sections of the sleeve and is threaded into a winding fixture 31.

As is clearly shown in the two views, the bobbin 90 in this instance acts only as a flange, and the screw 97 acts only as a retaining member, in distinction from the embodiments previously illustrated. The raised sections of the sleeve provide the base for winding. Such raised sections of the sleeve may be formed in any one of several ways, die-shaping of the relatively thin material being probably the most convenient.

In some instances it has proven desirable to provide some means for preventing the magnet wire from adhering to the surface of the bobbin. Several relatively simple refinements may be adopted to avoid such difficulties. The bobbin can be fabricated from a tetrafluoroethylene resin such as that designated by the trademark "Teflon" or other similar materials. Alternatively, a thin film of one of the various commercially available mold-release compounds may be applied to the bobbin by dipping, brushing, or other method. The preferred method of preventing sticking of the wire to the bobbin, however, is to apply a thin solid coating of "Teflon" or similar material to the bobbin by any of several well-known processes. Materials such as "Teflon" can be applied under controlled conditions in layers as thin as .001" successfully and uniformly. Their properties of resisting adhesion to almost all materials, but of adhering to metal tenaciously when applied by suitable known high temperature processes make them eminently suitable for purposes of my invention.

While I have disclosed in this specification the method which has proved most satisfactory for fabricating the coils and rotor for my particular torque generator, I recognize that a number of changes may well be made in the process to satisfy particular requirements. Inasmuch as I feel that such changes may be made in the process without departing from the essence of my invention, I intend to have the scope of my invention limited only by the appended claims.

What I claim as new and desire to secure by Letters Patent of the United States is:

1. In a method of fabricating a multiple coil assembly for a precision electrical device, the steps of fastening a sleeve to a winding fixture substantially concentric with said sleeve, fastening a plurality of bobbins in spaced relationship about the outer surface of said sleeve, the winding axes of said bobbins being perpendicular to the axis of said sleeve, winding a coil about each of said bobbins from a continuous length of wire, said wire being covered with plastic bonding material, heating said sleeves, coils and bobbins to fuse said plastic bonding material on respective turns of wire in each coil to cause said turns to adhere to one another and to said surface of said sleeve, and separating said sleeve from said winding fixture and said bobbins.

2. In a method of fabricating precision electrical apparatus, the steps which comprise fastening a support sleeve and a plurality of winding bobbins on the outer surface of said sleeve to a winding fixture substantially concentric with said sleeve, the winding axis of each of said bobbins being perpendicular to the axis of said sleeve, winding a coil from a continuous length of wire about each bobbin adjacent the outer surface of said sleeve, each said coil comprising turns of wire covered with plastic bonding material, applying heat to cause the plastic bonding material on respective turns of wire to bond the turns of wire in each said coil one to another and to the surface of said sleeve, transferring said bobbins to new positions on said sleeve and said winding fixture, winding a coil from a continuous length of wire about each said bobbin adjacent said outer surface of said sleeve, each said coil comprising turns of wire covered with plastic bonding material, applying heat to cause the plastic bonding material on respective turns of wire to bond the turns of wire in each of said last-mentioned coils one to another and to the surface of said sleeve, separating said sleeve and coils from said winding fixture and said bobbins, and connecting all said coils in series circuit relationship, whereby a multiple coil assembly is formed for insertion in said precision electrical apparatus.

3. In a method of fabricating a multiple coil assembly on a support sleeve for a precision electrical device, the steps which comprise fastening a plurality of winding bobbins in spaced relationship about the outer surface of said sleeve, the winding axes of said bobbins being perpendicular to the axis of said sleeve, winding turns from a continuous length of wire about said bobbins to form a plurality of serially-connected coils on the outer surface of said sleeve, said wire being coated with plastic bonding material, heating said sleeve, coils and bobbins to fuse said plastic bonding material causing said turns to wire to adhere to one another and to said sleeve and removing said bobbins whereby a multiple coil assembly is formed for insertion in said precision electrical device.

(References on following page)

References Cited in the file of this patent

UNITED STATES PATENTS

| | | |
|---|---|---|
| 542,945 | Rowland | July 16, 1895 |
| 1,134,840 | Goldthorp | Apr. 6, 1915 |
| 2,166,841 | Helgason et al. | July 18, 1939 |
| 2,177,260 | Laube | Oct. 24, 1939 |
| 2,282,759 | Gavitt | May 12, 1942 |
| 2,350,822 | Robinson | June 6, 1944 |
| 2,448,672 | Knauf | Sept. 7, 1948 |
| 2,453,749 | Hilsinger | Nov. 16, 1948 |
| 2,627,008 | Dunlop | Jan. 27, 1953 |
| 2,743,508 | Isaacson | May 1, 1956 |
| 2,766,392 | Wagner | Oct. 9, 1956 |
| 2,868,934 | Aske | Jan. 13, 1959 |

FOREIGN PATENTS

| | | |
|---|---|---|
| 859,501 | Germany | Dec. 15, 1952 |